US012684316B2

(12) United States Patent
Kuoppamaki et al.

(10) Patent No.: US 12,684,316 B2
(45) Date of Patent: Jul. 14, 2026

(54) PRIORITIZATION OF TRANSMISSION OF USER-INDICATED URGENT MESSAGES AND SYSTEMS AND METHODS OF THE SAME

(71) Applicant: T-Mobile USA, Inc., Bellevue, WA (US)

(72) Inventors: Karri M. Kuoppamaki, Kirkland, WA (US); Gaviphat Lekutai, Kirkland, WA (US); Jun Liu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 291 days.

(21) Appl. No.: 18/478,223

(22) Filed: Sep. 29, 2023

(65) Prior Publication Data

US 2025/0113170 A1 Apr. 3, 2025

(51) Int. Cl.
*H04W 4/20* (2018.01)
*H04M 1/72421* (2021.01)
*H04M 1/72436* (2021.01)
*H04W 4/14* (2009.01)

(52) U.S. Cl.
CPC ......... *H04W 4/20* (2013.01); *H04M 1/72421* (2021.01); *H04M 1/72436* (2021.01); *H04W 4/14* (2013.01)

(58) Field of Classification Search
CPC ......... H04M 1/72436; H04M 1/72421; H04W 4/14; H04W 4/20; H04R 1/406; H04R 3/005; H04R 29/005
USPC ...................................... 455/404.1
See application file for complete search history.

(56) References Cited

U.S. PATENT DOCUMENTS

| | | | |
|---|---|---|---|
| 6,892,074 B2 | 5/2005 | Tarkiainen et al. | |
| 7,024,548 B1 | 4/2006 | Otoole | |
| 7,552,068 B1 | 6/2009 | Brinkerhoff | |
| 8,401,032 B2 | 3/2013 | Hundscheidt et al. | |
| 8,406,792 B2 | 3/2013 | Aaltonen et al. | |
| 8,457,661 B2 | 6/2013 | Rossano et al. | |
| 8,549,611 B2 | 10/2013 | Judge et al. | |
| 8,630,666 B2 | 1/2014 | Roche | |
| 8,769,674 B2 | 7/2014 | Repasi et al. | |
| 8,855,615 B2 | 10/2014 | Jaiswal et al. | |
| 9,251,317 B2 | 2/2016 | Xu et al. | |
| 9,351,134 B2 | 5/2016 | Ruttenbur | |
| 9,531,862 B1 * | 12/2016 | Vadodaria | H04L 51/02 |
| 10,306,426 B2 | 5/2019 | Olof-ors | |

(Continued)

FOREIGN PATENT DOCUMENTS

| | | |
|---|---|---|
| CN | 1820472 B | 4/2010 |
| CN | 111095879 A | 5/2020 |

(Continued)

*Primary Examiner* — Maria El-Zoobi
(74) *Attorney, Agent, or Firm* — Perkins Coie LLP

(57) ABSTRACT

Methods and systems are disclosed herein for reprioritizing messages received at a short message service center (SMSC). The system maintains a queue of messages with prioritization. The system receives a first message transmission request. The system determines that the message transmission request contains a prioritization indicator. When the first message transmission request contains the first prioritization indicator, the system adds the first message to the queue at a higher rank than at least a subset of other messages in the queue that were received at the SMSC before the first message.

18 Claims, 10 Drawing Sheets

(56) References Cited

U.S. PATENT DOCUMENTS

| | | |
|---|---|---|
| 10,425,422 B1 | 9/2019 | Ledet |
| 10,616,149 B2 | 4/2020 | Wala et al. |
| 10,623,353 B2 | 4/2020 | Yang et al. |
| 10,721,193 B1 | 7/2020 | Chitrapu |
| 10,721,198 B1 | 7/2020 | Chitrapu |
| 10,984,186 B2 | 4/2021 | Pal et al. |
| 11,019,484 B2 | 5/2021 | Sharma et al. |
| 11,050,698 B1 | 6/2021 | Batchu et al. |
| 11,223,695 B2 | 1/2022 | Goodyear et al. |
| 11,276,082 B1 | 3/2022 | Sun et al. |
| 11,283,746 B1 | 3/2022 | Munukutla et al. |
| 11,366,818 B2 | 6/2022 | Allen et al. |
| 11,470,064 B2 | 10/2022 | Lally et al. |
| 2004/0151114 A1* | 8/2004 | Ruutu ..................... H04L 67/10 370/230 |
| 2006/0068761 A1* | 3/2006 | Chambers ............. H04L 51/226 455/414.1 |
| 2008/0040437 A1 | 2/2008 | Agarwal et al. |
| 2009/0047929 A1* | 2/2009 | Chesnutt ................. H04W 4/14 455/411 |
| 2011/0217997 A1 | 9/2011 | Jimenez et al. |
| 2012/0254950 A1 | 10/2012 | Majeti et al. |
| 2017/0257844 A1* | 9/2017 | Miller ............... H04M 1/72454 |
| 2020/0145465 A1* | 5/2020 | Al-Mehdar ......... H04L 65/1016 |
| 2020/0201488 A1 | 6/2020 | Zhou et al. |
| 2020/0328996 A1 | 10/2020 | Chitrapu |
| 2021/0281614 A1* | 9/2021 | Ahmad .............. H04L 65/1016 |
| 2023/0126032 A1 | 4/2023 | Swerdlow |

FOREIGN PATENT DOCUMENTS

| | | |
|---|---|---|
| KR | 20020072921 A | 9/2002 |
| WO | 2018074800 A1 | 4/2018 |

* cited by examiner

300

| Message Transmission Request 302 | |
|---|---|
| Message Identification Number 304 | 924023 |
| Sender Identifier 306 | +1-301-555-3234 |
| Apparent Recipient Identifier 308 | +1-510-555-9290 |
| Timestamp 310 | 2022-08-26T09:12:32-05:00 |
| Intended Message 312 | "Howdi, I'm at my grandmother's house, call me right now!!" |
| Prioritization Flag 314 | X |
| Location Flag 316 | Z |

| Sender ID 404 | +1-301-555-3234 |
|---|---|

| Message Prioritization Database 402 | | |
|---|---|---|
| Category 406 | Element 408 | Quality of Service Indicator 410 |
| Recipient Identifiers 412 | 911 (Domestic Emergency) | Very High |
| | 112 (International Emergency) | Very High |
| | +1-240-555-3942 (Hospital) | High |
| | +1-510-555-9290 (Mother) | High |
| Reference Characters 414 | '!' | High |
| | X | Very High |
| | 'hi' | Very Low |
| | '!!!!!!' | Very High |
| Tokens 416 | 'grandmother's house' | High |
| | 'emergency' | Very High |
| | 'injured' | Very High |
| | 'relaxing' | Very Low |

| Message Queue 502 | | | |
|---|---|---|---|
| Rank 506 | Message Identifier 504 | Time of Receipt at SMSC 508 | Quality of Service Indicator 510 |
| 1 | 859320 | 10:05 | Very High |
| 2 | 570324 | 10:06 | Very High |
| 3 | 730020 | 10:01 | Very Low |
| 4 | 271527 | 10:05 | High |
| 5 | 084718 | 10:03 | Very Low |
| 6 | 273432 | 10:08 | Very Low |

| Sender ID 604 | +1-301-555-3234 | |
|---|---|---|
| Message Modification Criterion 602 | | |
| Category 606 | Element 608 | Redirection Recipient Identifier 610 |
| Tokens 616 | 'howdi' | +1-718-555-3824 |
| | | 911 |
| | | +1-510-555-9290 |
| | 'Max' | +1-718-555-3824 |
| | | +1-510-555-9290 |
| Apparent Recipient 618 | +1-510-555-9290 | 911 |

620

622

+1-510-555-9290

624

9:32 am | Howdi, I'm at my grandmother's house, call me right now!!

626

628

911

I'm in danger. Original message: "Howdi, I'm at my grandmother's house, call me right now!!"

9:33 am

630

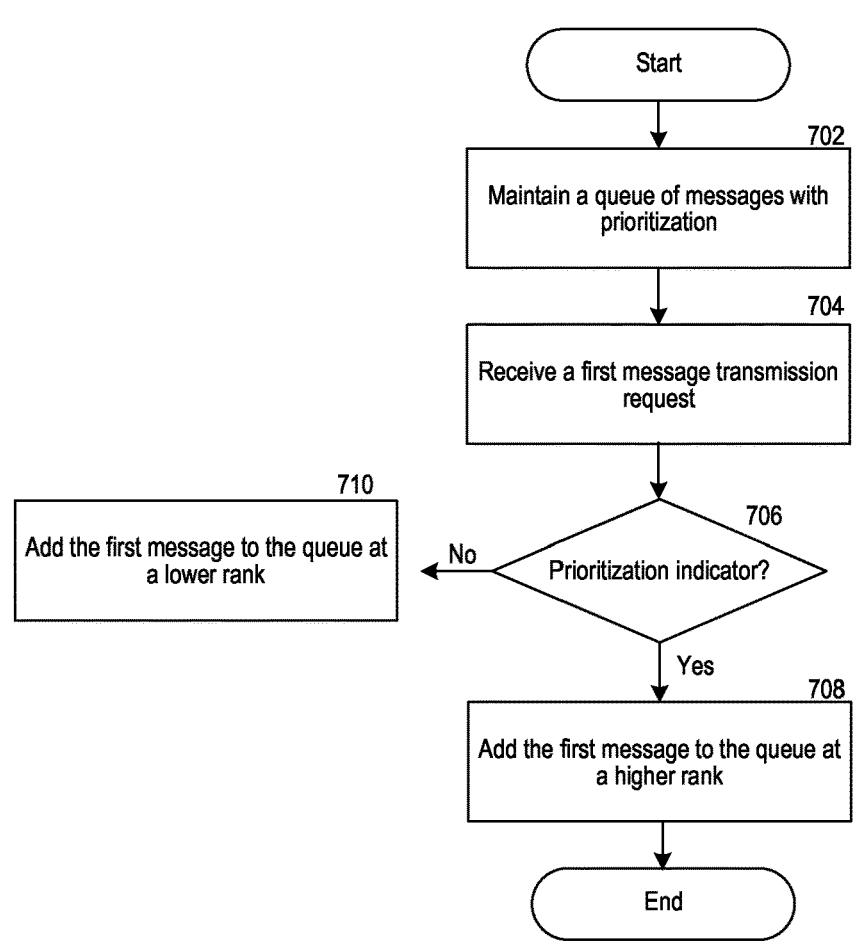
*FIG. 7*

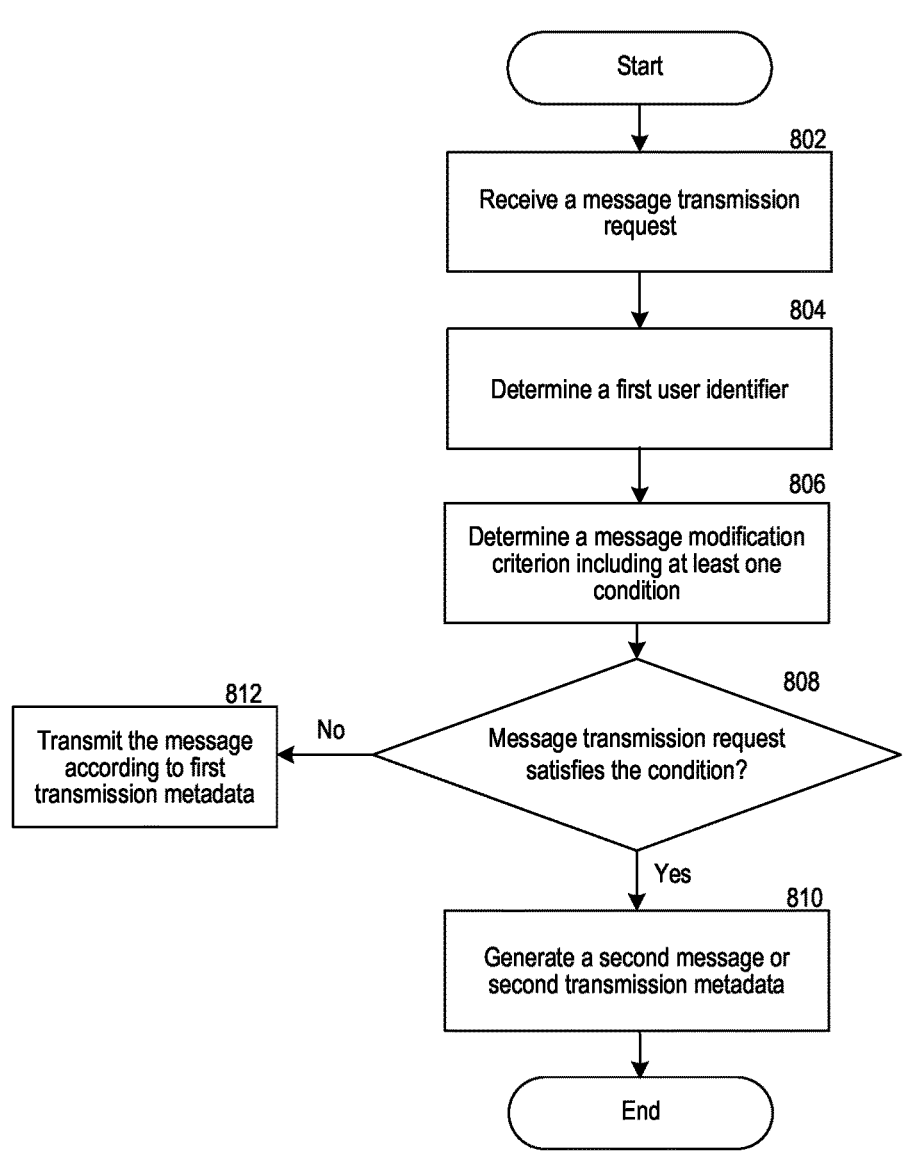
*FIG. 8*

900

PRIORITIZATION OF TRANSMISSION OF USER-INDICATED URGENT MESSAGES AND SYSTEMS AND METHODS OF THE SAME

BACKGROUND

A Short Message Service Center (SMSC) is a network element in the mobile telephone network. Its purpose is to store, forward, convert, and deliver Short Message Service (SMS) messages. The tasks of an SMSC can be described as the reception of text messages (e.g., SMS messages) from wireless network users, storage of text messages, forwarding of text messages, delivery of text messages to wireless network users, and maintenance of unique timestamps in text messages.

When a user sends a text message to another user, the message gets stored in the SMSC, which delivers it to the destination user when they are available. This is a store and forward option. The SMSC is responsible for handling the SMS operations of a wireless network. When an SMS message is sent from a mobile phone, it will first reach an SMSC. The SMSC then forwards the SMS message toward the destination. The main duty of an SMSC is to route SMS messages and regulate the process. If the recipient is unavailable (e.g., when the mobile phone is switched off), the SMSC will store the message. The SMSC will forward the SMS message when the recipient is available and the message's expiry period is not exceeded.

BRIEF DESCRIPTION OF THE DRAWINGS

Detailed descriptions of implementations of the present invention will be described and explained through the use of the accompanying drawings.

FIG. 4 is a schematic of a data structure representing a message prioritization database, in accordance with one or more implementations disclosed herein.

FIG. 5 is a schematic of a data structure representing a message queue, in accordance with one or more implementations disclosed herein.

FIG. 7 is a flowchart illustrating a process for prioritizing textual messages received at an SMSC based on prioritization indicators, in accordance with one or more implementations disclosed herein.

FIG. 8 is a flowchart illustrating a process for modifying a message transmission request received at an SMSC based on a message modification criterion, in accordance with one or more implementations disclosed herein.

Figure 1:
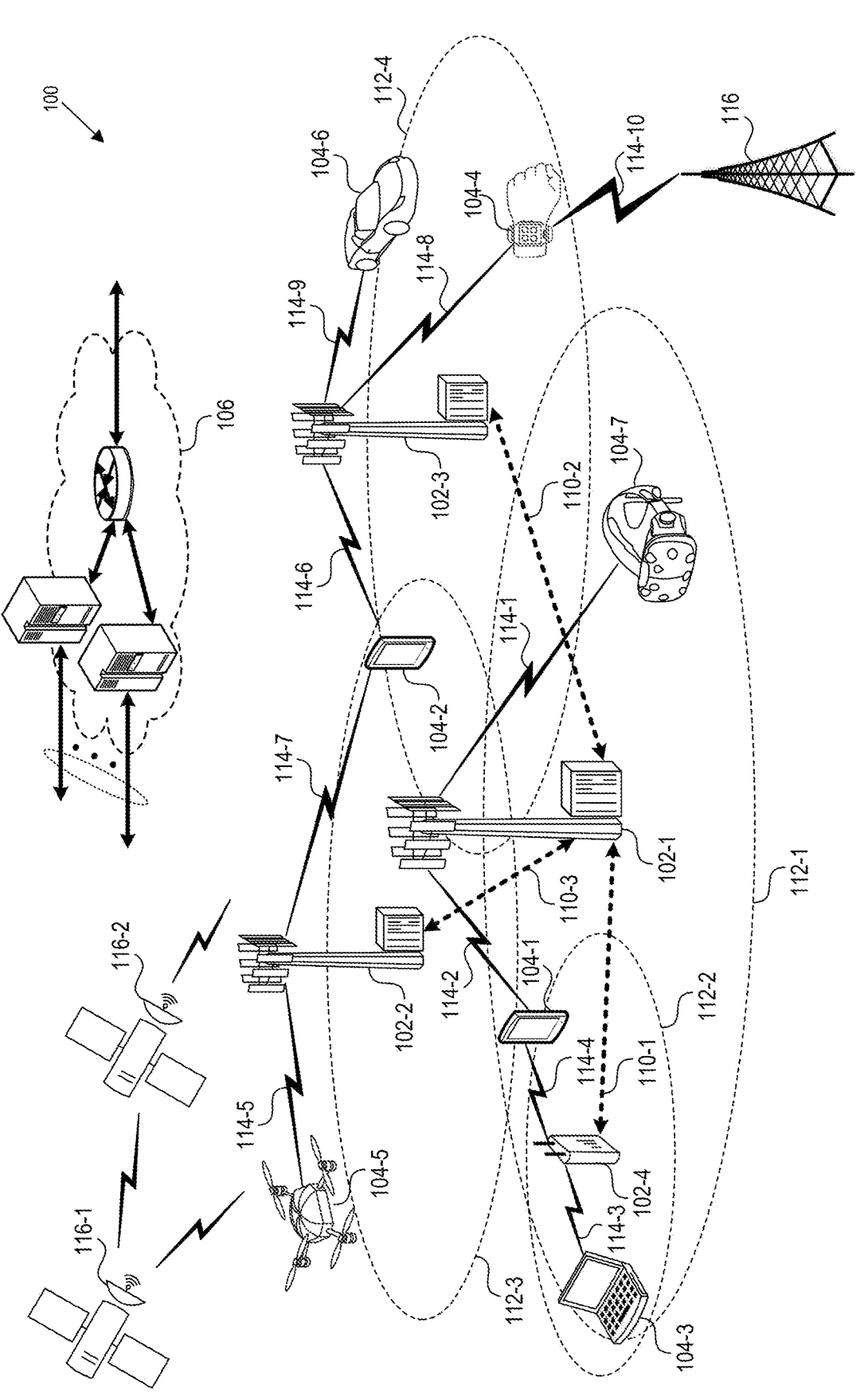
FIG. 1 is a block diagram that illustrates an example of a network system in which at least some operations described herein can be implemented.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Methods and systems are disclosed herein for prioritizing, modifying, and/or transmitting messages, such as SMS messages, that are received at an SMSC. For example, an SMSC disclosed herein modifies a rank associated with a received SMS message within a message queue based on indications of the message's priority with respect to other messages within the message queue. Alternatively or additionally, the SMSC can determine to modify the message in order to generate a second message and transmit this second message to another recipient based on a predetermined criterion for handling the message.

In conventional SMSCs and message handling systems, received messages that are intended for transmission to an intended recipient are sent to the intended recipient in order of receipt of the message at the SMSC. For example, a first user may request transmission of a message from their device to a second device associated with a second device. The SMSC may receive this request at a point in time and execute the request in order of receipt of this message. For example, the SMSC attempts to fulfill message transmission requests that were received earlier than requests that were received at later times. As such, traditional SMSCs do not have the ability to prioritize messages based on the nature of the requested transmission. As an illustrative example, during an emergency, such as a natural disaster or a crime emergency, a conventional messaging center transmits received SMS messages to their intended recipient without regard to the sender, intended recipient, or the nature of the message. Thus, emergency messages from victims of the emergency (e.g., to their loved ones) are handled with the same priority as unimportant messages unrelated to the emergency. Similarly, emergency messages directed toward emergency personnel or other important actors are assigned the same priority as SMS messages to unimportant entities. This lack of prioritization can result in severe delays in the transmission of emergency messages during emergencies, during which network bandwidths may be limited or at capacity. As a result, victims of such emergencies may struggle to contact help in time, while unimportant messages may be sent to their recipients earlier depending on a time of receipt of these messages at the SMSC.

Furthermore, message transmission requests received at conventional SMSCs handle such requests based on the associated metadata received. For example, conventional SMSCs can receive an SMS message transmission request from a user intending to send a text message to another user (e.g., using an indication of this intended recipient's phone number). Conventional SMSCs subsequently transmit the text message to the recipient's phone number as indicated in the associated message transmission request. However, in some situations (e.g., under compulsion from a kidnapper or another malicious entity, such as during an emergency), a user may transmit a message transmission request that appears as though a message with an apparent message body is directed to an apparent recipient. However, this user may intend to transmit a different message to a different recipient to request help without showing an indication of this message on the user's device. For example, the user may have safety concerns over a malicious entity discovering that the user intended to send a message to an emergency number. Conventional SMSCs would transmit this message to the apparent recipient rather than a different intended recipient. As such, conventional SMSCs do not allow users to mask text messages to hidden intended recipients.

The methods and systems disclosed herein are directed to improvements in handling messages to solve these issues with conventional SMSCs. For example, the system can prioritize messages received from users such that emergency messages, or other important messages, are transmitted to recipients over other unimportant messages. For example, the system can maintain a queue of received SMS messages for forwarding to intended recipients. The message queue can include a rank that indicates an order in which received requests are handled (e.g., for transmission of SMS messages to the intended recipient). Based on data associated with the received SMS transmission request, the system can prioritize the message and modify its rank in the queue accordingly.

As an illustrative example, the system can receive an SMS transmission request from a user for transmission of an emergency message (e.g., including a location) to an emergency responder (e.g., associated with a number associated with an emergency responder, such as a local hospital). During an emergency, due to bandwidth limitations, the network may be at capacity, thereby leading to delays in transmission of messages received at the SMSC. The disclosed system can, in response to detecting that the emergency message is directed to an emergency responder, modify the rank of the message to differ from its arrival time. As such, the SMSC disclosed herein can transmit the emergency message at an earlier time than messages received at the SMSC prior to the emergency message. By doing so, the system disclosed herein enables prioritization of SMS messages based on data associated with such messages, thereby enabling messages of high importance to be delivered to their intended destinations over unimportant messages in situations where the network is determined to be congested.

Additionally or alternatively, the disclosed system can modify aspects of the transmission of SMS messages based on predetermined criteria, thereby enabling users to send discreet or masked messages with attributes or characteristics that differ from those requested in the original transmission request received at the SMSC. For example, the disclosed system can receive a message transmission request from a user, such as a request where the user indicates an apparent recipient of an associated SMS message. The system can modify this request according to predetermined modification criteria. In some implementations, the user specifies such modification criteria. For example, the user may request that any message transmission requests that include a predefined keyword, such as the text string "howdi," cause a predetermined message to be forwarded to a recipient other than the recipient indicated on the message transmission request, such as another trusted user or family member. As such, in situations where the user feels threatened or harmed, such as during an abusive or violent interaction, the disclosed system enables the user to send a request for help to another entity based on the nature of the message without such a request being apparent on the user's mobile device. Thus, the disclosed system enables users to receive requested assistance or send messages to trusted parties during threatening or difficult periods of time while masking such requests, thereby enabling the users to stay safe from retaliation or other malicious actions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality-of-service (QoS) requirements and multi-terabits-per-second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Figure 2:
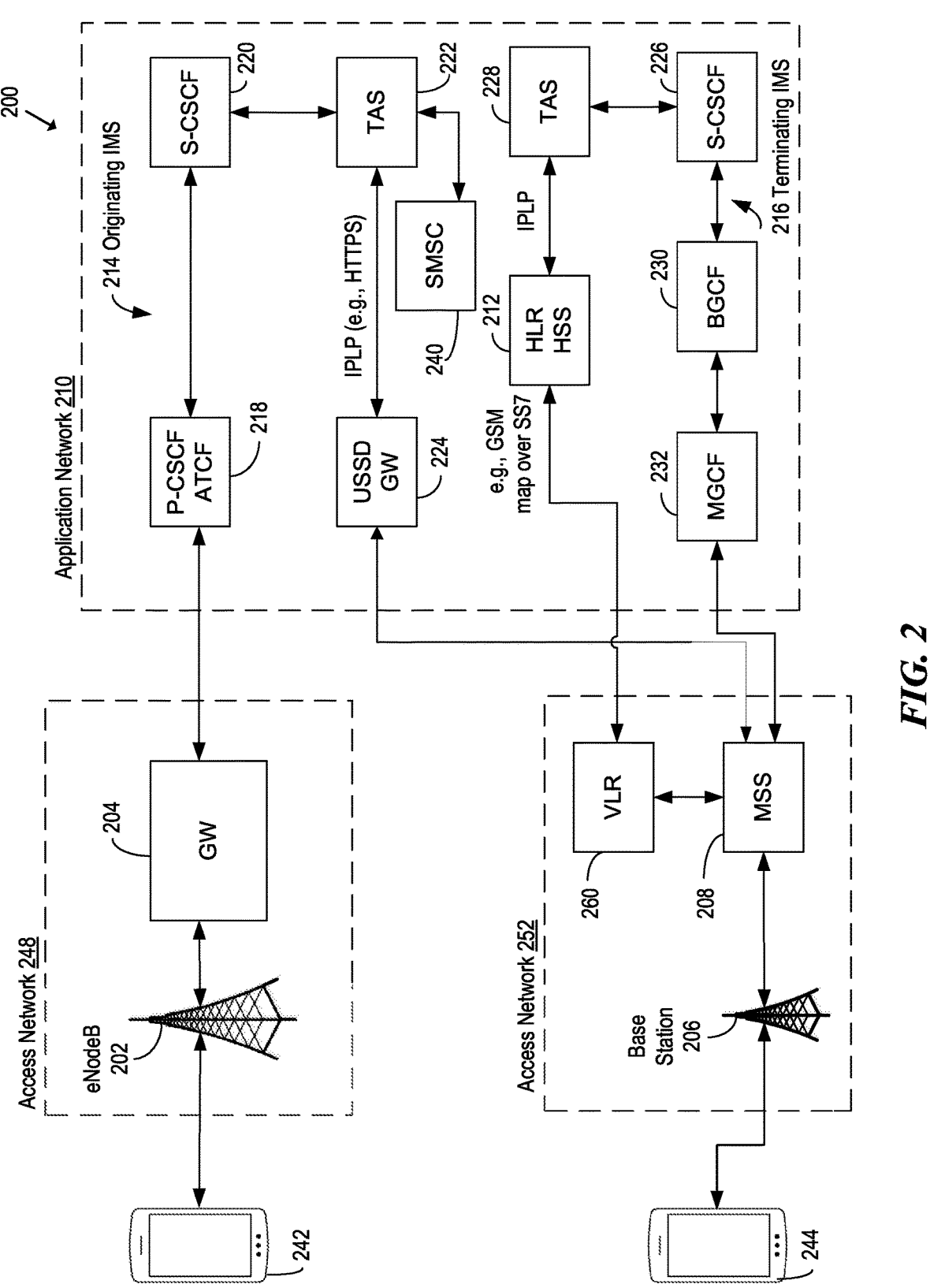
FIG. 2 is a block diagram that illustrates an example telecommunications network, including components used to establish communication sessions or perform short message service (SMS) exchanges.

FIG. 2 is a block diagram that illustrates an example telecommunications network, including components used to establish communication sessions or perform short messaging service (SMS) exchanges. The illustrated blocks represent NFs that can be implemented as standalone devices or combined with other NFs into a single device or collection of devices.

Terminal 242 can be attached to access network 248 of the telecommunications network 200, and terminal 244 can be attached to access network 252. For example, access network 248 includes a packed-switched (PS) access network, e.g., an Evolved Packet System (EPS) network, and access network 252 includes a circuit-switched (CS) access network. PS access network 248 can include an eNodeB 202 (e.g., a 4G base station or other access point) that provides connectivity to the PS access network 248. The eNodeB 202 can be connected with a gateway (GW) 204, e.g., an LTE S-GW or P-GW. CS access network 252 can include a base station 206, e.g., a NodeB, and a mobile switching server (MSS) 208. CS access network 252 can also include a visitor authorization server 260, depicted as a visitor location register (e.g., VLR).

Access networks 248 and 252 can communicate with an application network 210, e.g., an Internet Protocol (IP) Multimedia Subsystem (IMS) network or other network providing services to terminal 242. Application network 210 can include an "upper-level" network that uses the services provided by access networks 248 and 252 to communicate with terminals 242 and 244. Application network 210 can include a home location register (HLR) or home subscriber network (HSS), e.g., HLR/HSS 212, which can be among, or otherwise represent, home authorization server systems. Other examples of home authorization server systems can include, e.g., an equipment identity register (EIR), an enhanced EIR (EEIR), a DNS server, or an E.164 Number Mapping (ENUM) server. In some examples, such as that shown, HLR/HSS 212 can communicate via GSM (Global System for Mobile communication) Map with VLR 260. Examples include roaming situations in which VLR 260 of a serving network does not support IP-based Lightweight Protocol (IPLP)-based communication.

Application network 210 can include components of an originating IMS (O-IMS) 214 and a terminating IMS (T-IMS) 216. Either IMS can originate or terminate on a session-by-session basis; it is not required that either be wholly dedicated to origination or termination. O-IMS 214 can include a number of nodes, such as a proxy call session control function (P-CSCF) 218 (which can also represent an ATCF), a serving call session control function (S-CSCF) 220, a TAS 222 (originating TAS, O-TAS), and a USSD gateway (GW) 224. As used herein, a USSD GW is any device performing USSD functions described herein, whether implemented as a standalone device or not.

T-IMS 216 can include an S-CSCF 226, a TAS 228 (terminating, T-TAS), a BGCF 230, and an MGCF 232. TASs 222 and 228 can be examples of application servers (ASs) and can represent application server systems. O-IMS 214 can additionally or alternatively include other components, e.g., additional ASs, such as an SMSC 240. In an example of session-control services, an SIP signaling path of a communication session can pass from the terminal 242 through eNodeB 202, GW 204, P-CSCF/ATCF 218, S-CSCF 220, O-TAS 222 (and/or SMSC 240), back through S-CSCF 220, through S-CSCF 226, through T-TAS 228, and back to S-CSCF 226, BGCF 230, MGCF 232, MSS 208, and base station 206 to terminal 244, in that order or another order. In some implementations, such as that shown, TASs 222 and 228 can communicate with USSD GW 224 and HLR/HSS 212, respectively, via an IPLP such as HTTPS.

The telecommunications network 200 further includes a message transmission system. In at least some implementations, the message transmission system includes an SMSC 240 in the telecommunications network 200. For example, the message transmission system can be an SMSC that is modified to perform SMS reprioritization functions as described herein. Some implementations of the message transmission system alternatively include a computing device that communicates with a conventional or modified SMSC. Such a computing device can perform some or all of the functionality described herein as being performed by the SMSC, or can perform some functions while the SMSC 240 performs other functions.

The SMSC 240 may include a portion of a mobile phone network for handling text message operations. For example, the SMSC 240 can receive, store, route, and forward SMS messages from user devices, such as mobile phones, mobile devices, tablets, or any other user devices. In some implementations, the disclosed network includes many SMSCs. The SMSC can receive message transmission requests, indicating a message to be sent to an intended recipient by a user of a mobile device. The SMSC can respond to the message transmission request to indicate an acceptance or a rejection of the request. The SMSC can maintain a message queue, where the message queue includes information relating to times of receipt of messages or data from user devices (e.g., timestamps), as well as an order in which the messages or data is to be dispatched. In some implementations, the SMSC can determine whether the recipient device is available to receive a given message (e.g., an SMS). In situations where the recipient device is determined to be unavailable, such as where the recipient device is turned off, the SMSC can store the message for transmission at a later time when the recipient device is determined to be on.

In some implementations, as described further below, the message transmission system modifies a ranked order of messages within the message queue based on determining a prioritization indicator for the given messages, as described below. In some implementations, the message transmission system can redirect messages (e.g., sends the same message to a different recipient, a different message to the same recipient, or a combination thereof) based on criteria associated with the source of the message, as described below. As such, the message transmission system can provide a flexible, secure way to manage transmission of text messages between devices on a network based on bandwidth constraints or detection of emergencies, for example.

The telecommunications network 200 may also include a number of devices or nodes not illustrated in FIG. 2. Such devices or nodes may include an ATGW, a serving GPRS support node (SGSN), a gateway GPRS support node (GGSN), a policy control rules function (PCRF) node, or a session border controller (SBC). O-IMS 214 may further include a number of devices or nodes not illustrated in FIG. 2, such as a presence server and one or more additional CSCFs.

The telecommunications network 200 may provide a variety of services to the terminal 242, such as synchronous communication routing across a PSTN. Further services may include call control, switching, authentication, billing, etc. In at least one example, O-IMS 214 functions and devices communicate using specific services provided by the serving network, or elements thereof, but are not directly tied to those specific services. For example, 0-IMS 214 devices can intercommunicate using an EPC network, a GSM network, a SONET network, a 5G network, or an Ethernet network.

Message Transmission System

Figure 3:
FIG. 3 is a schematic of a data structure representing a message transmission request, including transmission metadata, in accordance with one or more embodiments described herein.

FIG. 3 is a schematic 300 of a data structure representing a message transmission request 302, including transmission metadata, in accordance with one or more implementations described herein. For example, a message transmission request can include an SMS message sent from a first user's mobile device to another intended recipient associated with another mobile device.

As an illustrative example, the message transmission request 302 includes transmission metadata that characterizes the message received (e.g., at the SMSC). Transmission metadata can include any information or data that describes a message and its transmission, including the contents of the message, a time at which the message is sent or received, and any associated users (e.g., recipients or senders). For example, the message transmission request 302 includes an identifier of the message to be sent, such as a message identification number 304. The message transmission request 302 (e.g., the transmission metadata) can include a sender identifier 306, identifying the source of the message (e.g., a phone number associated with a mobile device from which the sender sent the message). The message transmission request 302 can include an apparent recipient identifier 308 identifying an apparent or intended recipient of the message. For example, apparent recipient identifier 308 can include a phone number associated with a mobile device to which the message is addressed. The sender can specify the apparent recipient identifier 308 within a field or text box in a user interface on the sender's mobile device identifying the intended recipient of the corresponding message. The message transmission request 302 can include a prioritization flag 314 that indicates a priority for the message.

The message transmission request 302 can include a timestamp 310 indicating a time associated with the message. For example, timestamp 310 describes a time of submission of the message to the network (e.g., a time at which a sender presses a button to send the message from the sender's mobile device). Additionally or alternatively, timestamp 310 describes a time of receipt of the message transmission request 302 at an SMSC associated with the telecommunications network 200. Receiving or determining the timestamp 310 enables the message prioritization system to determine an order (e.g., within a message queue associated with the SMSC 240) for satisfaction of the message transmission request, thereby enabling prioritization of messages according to time of submission or receipt.

The message transmission request 302 can include an intended message 312 for transmission. A message can include an indication of any information or data (e.g., verbal or auditory) to be transmitted from one entity to another. For example, a message can include a textual message that includes alphanumeric characters (or characters of any language) that indicate a verbal message in a human language. Methods and systems disclosed herein can execute operations on any type of message, including textual messages or voice messages. In some implementations, a textual message may not include human language and can include any other written characters or strings. In some implementations, a message includes audio data, such as a voicemail message or a voice call transmission. For example, a message may include an audio recording in an audio file format to be transmitted to another recipient within the telecommunications network 200. By receiving messages at an SMSC 240 or any message transmission system, the message transmission system can handle such messages securely and in a timely manner based on prioritization and/or message redirection according to user preference or settings.

The message can include elements. An element of a message can include any portions, tokens, or characters of a message. For example, a textual message may include elements such as alphanumeric characters, special characters (such as exclamation points, ampersands, or quotation marks), words (e.g., collections of characters separated by spaces or human language words), phrases (e.g., collections of words), or any other tokens. In some implementations, an element of a message includes a pattern, characteristic, or attribute of the message—for example, a message that is written in all capital letters may be characterized by an element defined by "all capital letters." Additionally or alternatively, an element of a message can include a determination that a message is written with artificial intelligence or otherwise synthetically, such as through an artificial intelligence (AI) content detector. By defining and characterizing elements associated with messages, the message transmission system (e.g., the SMSC 240) enables evaluation and handling of messages received from users that are intending to transmit a message to another entity for priority. Additionally or alternatively, the message transmission system enables redirection of messages based on these elements (e.g., transmission of a different message, or to another person, or any combination thereof).

The message can include priority tokens. A priority token can include a word, sentence, phrase, interjection, or any other language token that signifies a priority for a corresponding message. As an illustrative example, a priority token includes an interjection or question that commonly signifies an emergency or another urgent situation, such as "oh my god!," "call me right now!" or "are you hurt?" In some implementations, the message transmission system (e.g., the SMSC 240) can determine that a message includes such a priority token and determine that the message is high priority, thereby enabling the system to forward messages to their recipients at a time that is based on these determined priorities. In some implementations, based on determining that a message includes a priority token or otherwise, the message transmission system generates an updated message or a second message that includes additional information relating to the sender. As an illustrative example, the updated message can include information relating to the location of a sender, such as geographical coordinates associated with the sender's device. For example, the message transmission system can generate a message that includes a latitude and longitude associated with the sender's device or an IP address for associated Wi-Fi equipment. By doing so, the message transmission system enables a recipient of the message to obtain information relating to the location of the sender, thereby improving the efficiency of dispatching emergency services to the sender in situations of distress or emergency.

The message can include flags. For example, the message transmission request 302 includes the prioritization flag 314, which provides an indication of a priority for the message. For example, the prioritization flag 314 can include an indicator or field in a data structure associated with the message transmission request 302 that indicates a particular priority for the message. As an illustrative example, a first user (e.g., a sender) of the message can set a priority flag (e.g., a toggle) using physical buttons on the phone or using a user control on a user interface associated with the corresponding mobile device. In some implementations, the flag can indicate multiple levels of priority, such as a high level, a low level, and/or a medium level, based on different combinations of physical button presses or operations. By doing so, the message transmission system enables a sender to determine a priority of the message and present this to the message transmission system (e.g., the SMSC 240) for subsequent transmission of the message according to the determined priority.

In some embodiments, the message transmission request includes a location flag 316, as shown in FIG. 3. In some embodiments, the location flag 316 is determined or obtained by determining the presence of a token or reference character within the message (e.g., a character or string of characters, such as "Z", "!", or "hi"). Additionally or alternatively, a sender can set a location flag through physical buttons, button combinations, or user controls on a user interface associated with the corresponding mobile device. The location flag 316 can indicate a request to obtain and/or transmit location data to an intended recipient of a message. For example, based on determining that the message transmission request 302 includes a location flag, the message transmission system can obtain location information of the sender (e.g., a latitude and longitude, or an associated IP address, such as an IP address of a Wi-Fi access point connected to the sender's mobile device). The message transmission system can generate an updated message and/ or updated message metadata that includes this location data. By doing so, the message transmission system enables users to transmit location information to intended recipients in a masked or hidden manner, thereby enabling the intended recipients to assist or aid the sender during distressing situations or emergencies on the basis of the sender's location.

A sender of a message (e.g., a first user) can include an entity attempting to transmit a message from a corresponding user device, such as a mobile device. A sender can include a user of a mobile phone, for example, with a user identifier corresponding to a mobile phone number (e.g., with a country code, area code, telephone prefix, and/or a line number), as shown as the sender identifier 306 in FIG. 3. In some implementations, a user identifier can include another identifier, such as a username within the network, an email address, or any other identifier of a corresponding user and/or device. A sender can send messages (e.g., text messages (SMSs), video messages, voice messages, or other messages) to an intended recipient and/or an apparent recipient. Such messages can be transmitted to a message transmission system, such as an SMSC 240, for further forwarding to the intended recipient.

Figures 6A, 6B:
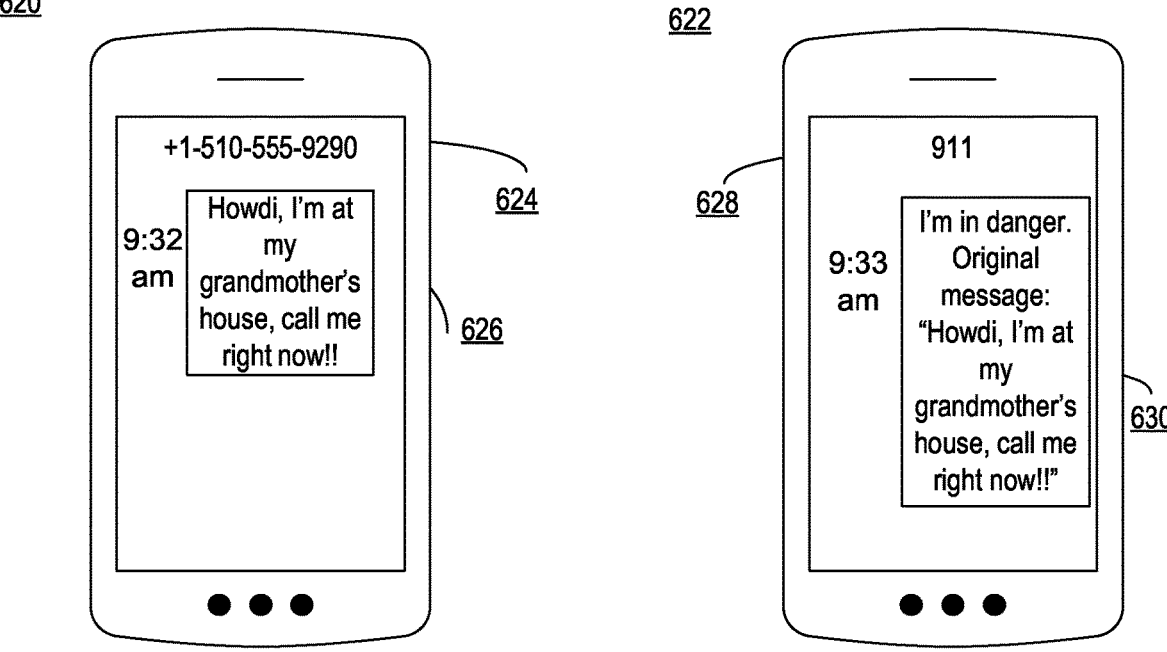
FIG. 6A is a schematic of a data structure representing a message modification criterion, in accordance with one or more implementations disclosed herein.
FIG. 6B is a schematic of a first textual message and a generated second textual message based on a message modification criterion, in accordance with one or more implementations disclosed herein.

A recipient of a message (e.g., a second user) can include an intended or apparent recipient of a message. For example, a recipient of a message can include an entity that receives a message on a corresponding mobile device. In some implementations, an apparent recipient can include a recipient explicitly determined by the sender or included in a message request by the sender. For example, an apparent recipient can include the apparent recipient identifier 308 included with the message transmission request 302 as determined by the user on a user interface in the sender's user device. In some cases, the apparent recipient is different from the intended recipient. As an illustrative example, the SMSC 240 can receive the message transmission request 302 including the apparent recipient identifier 308. However, the SMSC 240 can determine, through message modification criteria, whether to send the message to the apparent recipient or, alternatively or additionally, to send the message to an intended recipient, where the intended recipient is different from the apparent recipient. For example, a sender may attempt to mask the actual recipient of a message by including an apparent recipient that differs from the intended recipient. Based on the message modification criteria (as shown in FIG. 6A), the message transmission system can generate a message to the sender's intended recipient, even if this differs from the apparent recipient included within the message transmission request 302.

FIG. 4 is a schematic of a data structure 400 representing a message prioritization database, in accordance with one or more implementations disclosed herein. For example, FIG. 4 describes a portion of a message prioritization database 402 corresponding to a sender identifier 404. The message prioritization database 402 can include information relating to how to classify priority levels of messages received at a message transmission system (e.g., an SMSC 240) based on a corresponding message transmission request. For example, the message prioritization database 402 can include categories 406 corresponding to different methods or features associated with determining the priority of a message; each of these methods can be associated with elements 408. For example, the message transmission system can determine that an element of elements 408 is included within a message from a sender corresponding to sender identifier 404, and, as such, the message transmission system can determine a corresponding QoS indicator (e.g., also referred to as priority level or prioritization indicator) of the QoS indicators 410. As such, the message prioritization database 402 enables the system to prioritize certain sent messages over other sent messages in a user-specific or user-customizable manner. As such, prioritization can be dependent on the sender identifier 404.

For example, the elements 408 can correspond to prioritization indicators, which can include elements that aid in determination of a priority for a corresponding message transmission request. As an illustrative example, a prioritization indicator can include an indication that the message may be of a particular QoS level (e.g., high priority, low priority, or medium priority). A prioritization indicator can be dependent on the sender's user identifier; for example, the sender can determine prioritization indicators that are specific to the sender's mobile device.

A prioritization indicator can include recipient identifiers 412, which correspond to apparent or intended recipients associated with a sender's message or message transmission request. For example, the SMSC 240 can determine that an apparent recipient identifier corresponds to that of an emergency number (e.g., 911, 112, or 999) and determine a corresponding QoS indicator based on identifying these prioritization indicators within the message transmission request.

Additionally or alternatively, a prioritization indicator can include one or more reference characters 414. For example, a reference character can include a character that indicates a corresponding priority for the message. Such reference characters can be predefined in a reference database (e.g., a data storage element for storing characters associated with corresponding priority levels) by the user and/or the message transmission system. For example, in some implementations, a sender can determine that any messages by the sender that include five exclamation points in a row ("!!!!!"), as shown in FIG. 4, correspond to a prioritization indicator. As such, the message transmission system can reflect this determination within the sender's corresponding entry within the message prioritization database 402. By doing so, an SMSC 240 corresponding to the message transmission system enables user control over how messages' priorities are determined.

In some implementations, a prioritization indicator of the elements 408 can include tokens 416 (e.g., natural language tokens or priority tokens) that are indicative of a priority for a corresponding message. For example, words that are more likely to be associated with an emergency (e.g., "emergency" or "injured") can be conferred a higher priority QoS indicator, as shown in FIG. 4, while words or phrases that are less likely to be indicative of an emergency situation can be conferred a lower QoS indicator, such as the word "relaxing" or the phrase "grandmother's house" shown in FIG. 4. By determining such phrases within a message, the message transmission system can determine priority levels (e.g., QoS indicators) for incoming messages, thereby enabling the system to determine an order in which to send the messages that is dependent on these determined priority levels.

In some implementations, a natural language processing (NLP) model can determine whether a message includes priority tokens. An NLP model can include models that are configured to process and/or analyze natural language data. As an illustrative example, the NLP model can determine a likelihood or a quantitative metric as to a priority level (e.g., a QoS indicator) associated with a message that is provided as input. For example, in some implementations, the message transmission system can provide the NLP model with the message and determine a QoS indicator directly. Additionally or alternatively, the NLP model can provide a list of priority tokens (e.g., words, phrases, or sentences) within the message, as well as corresponding prioritization indicators (e.g., QoS indicators or a quantitative priority metric) for each of these tokens. Based on these priority tokens, the message transmission system (e.g., the SMSC 240) can determine an average priority level for the message and classify the message's priority level (e.g., determine a QoS indicator for the overall message) accordingly.

In some implementations, the message prioritization database 402 can define or store de-prioritization indicators. De-prioritization indicators can include elements (e.g., elements 408) that, if found within a message, decrease the prioritization level of a message. As an illustrative example, the message transmission system can determine that a message that includes the token "relaxing" is likely to be lower priority, and, in response, the message transmission system (e.g., the SMSC 240) can determine that this message is low priority, such as by associating a QoS indicator of a "Very Low" level. By doing so, the message transmission system enables relative prioritization of messages based on determining high-priority or low-priority messages and prioritizing their transmission to the intended recipients accordingly.

In some implementations, the SMSC 240 (or message transmission system) can update the message prioritization database 402 dynamically and/or temporarily to include elements 408 associated with real-time emergencies. For example, during a natural disaster relating to a flood, the message prioritization database 402 can include elements that enable the system to prioritize messages relating to floodwater (e.g., including phrases, words, or tokens related to "floodwater") over other types of messages.

FIG. 5 is a schematic of a data structure 500 representing a message queue 502, in accordance with one or more implementations disclosed herein. For example, the message queue 502 can include a list of messages identified by message identifiers 504 that were received at a message transmission system (e.g., an SMSC 240). The messages can be ordered according to ranks 506 and can depend upon a time of receipt at the SMSC 240 (e.g., times 508) or corresponding QoS indicators 510 associated with the messages. By ordering messages according to a rank that is distinct from a time of receipt, the message transmission system enables prioritization of certain messages over other messages, even if such messages were sent from the sender or received at the SMSC at a later time than lower priority messages.

For example, the SMSC 240 can determine the ranks 506 of the messages primarily based on the time of receipt of the messages at the SMSC (e.g., at a message transmission system). The SMSC 240 can prioritize messages received earlier over messages received later (e.g., to reduce average delays in message transmission across the system). However, in some situations, such as during emergency situations, bandwidth within the network can be limited. For example, where there is significant user activity at a particular location due to an emergency situation, bandwidth within the telecommunications network 200 can be limited, and an SMSC associated with that geographical region can be overwhelmed with messages of users attempting to contact loved ones or emergency services all at once. For example, the message queue 502 can generate the ranks 506 by prioritizing (e.g., providing a higher rank with a lower rank number) messages with QoS indicators that are higher than other messages received within a threshold period of time before and/or after receipt of the message. In such a situation, the disclosed systems and methods enable prioritization of transmission of more important or urgent messages over other messages (e.g., unrelated to the given emergency), enabling more effective use of limited bandwidth within the telecommunications network 200.

In disclosed implementations, an emergency can include an urgent, critical, or difficult situation. For example, an emergency may include a natural disaster (e.g., an earthquake, fire, tornado, flood, tropical cyclone, drought, or any other disaster). An emergency can include human-caused issues, such as conflicts, attacks, civil disorder, or war. In cases, an emergency includes a technological disaster, such as a fire, hazardous materials accident, or chemical/biological/radiological (CBR) emergencies. In some cases, an emergency can include a health emergency, such as an outbreak of an infectious disease. Emergencies can have start times or end times (e.g., as defined by authoritative bodies or government agencies). The message transmission system can determine to prioritize messages (e.g., according to prioritization indicators) only during emergencies; as such, the system can determine to transmit messages to intended recipients according to timestamps after determining the end of an emergency. In some implementations, the message transmission system can process the message transmission requests based on priority when network traffic is determined to be above a threshold amount (e.g., in situations where there is limited network bandwidth).

FIG. 6A is a schematic of a data structure 600 representing a message modification criterion 602, in accordance with one or more implementations disclosed herein. For example, the message modification criterion 602 can include requirements or conditions for modifying a message transmission request (e.g., at an SMSC 240) according to a characterization of the associated message. For example, the message modification criterion 602 is specific to a given sender with a sender identifier 604. The message modification criterion 602 can include information relating to elements 608 found within the message, where the elements 608 may be associated with corresponding categories 606. In some implementations, the message modification criterion 602 can specify, when a particular element of the elements 608 is included within a given message or is associated with a corresponding message transmission request, that a message be sent or redirected to corresponding redirection recipient identifiers 610.

FIG. 6B is a schematic of a first textual message and a generated second textual message based on a message modification criterion, in accordance with one or more implementations disclosed herein. For example, illustration 620 describes a text message as entered at a sender's phone, including an apparent recipient 624 and an apparent message 626 associated with first message metadata. Based on identifying an element of the message modification criterion 602, the message transmission system (e.g., an SMSC 240) can generate an updated message 630 to send to a different, intended recipient 628, as shown in illustration 622. By doing so, the message transmission system enables masking of messages intended for different recipients or for transmission of different messages.

As an illustrative example, the SMSC 240 can determine that the message (e.g., the intended message 312 as shown in FIG. 3 or the message 626 of FIG. 6B) includes one of elements 608, such as a predefined keyword, such as the phrase "howdi." A keyword can include a word, phrase, or other element or token that has been predetermined to indicate message modification (e.g., a word, phrase, or element determined by a sender to be indicative of a request to generate a modified message transmission request). The SMSC 240 can determine to send the same message or a different message to other recipients (e.g., as stored as redirection recipient identifiers 610) by modifying message transmission metadata accordingly. By doing so, the message transmission system disclosed herein enables users (e.g., senders) to mask intended recipients by causing the message transmission system to send another message or the same message to a different recipient based on a determination that the user intended this redirection (e.g., by including a predefined token within a predefined, user-specific message modification criterion 602). As such, a user can avoid the appearance of sending a message to an entity that may lead to hardship or trouble (e.g., in situations involving domestic violence or distress).

In some implementations, the message modification criterion 602 can determine to generate these modified messages (e.g., redirect messages) based on apparent recipient 618 indicated by the user's message transmission request. For example, the message modification criterion 602 can determine to send a message or initiate a phone call to an emergency service (e.g., 911) if the sender's message transmission request indicates an apparent recipient that is different. By doing so, the message transmission system can mask text messages or calls intended for emergency services by enabling the user to use another number as an apparent recipient of the text message. As such, the message transmission system improves the safety and effectiveness of emergency calls in situations where the sender fears retaliation, for example.

The message modification criterion 602 can include elements as described previously, including message modification flags (similar to prioritization flag 314 of FIG. 3), or other elements, including tokens 616 or reference characters (e.g., as shown in FIG. 4 with respect to one or more reference characters 414). In some implementations, the message modification criterion 602 can leverage an NLP model for determination as to whether to generate the modified message transmission metadata in response to a sent message.

Process for Message Prioritization

FIG. 7 is a flowchart 700 illustrating a process for prioritizing textual messages received at a message transmission system (e.g., an SMSC) based on prioritization indicators, in accordance with one or more implementations disclosed herein. For example, the process illustrated in FIG. 7 enables the SMSC 240 to dispatch messages determined to be higher priority sooner than messages determined to be lower priority based on a ranking within an associated message queue, thereby improving the efficacy of message transmission in situations of limited network bandwidth.

At operation 702 (e.g., using one or more components described above), the message transmission system can maintain a queue of messages with prioritization. For example, the message transmission system can maintain a queue of messages transmitted to or from user devices in the telecommunications network, wherein a message at a higher position rank in the queue is transmitted from the SMSC to a corresponding recipient before a message at a lower position rank in the queue. As an illustrative example, the message transmission system (e.g., the SMSC 240) can maintain the message queue 502 for determining when to dispatch messages (e.g., text messages) to intended recipients. By doing so, the SMSC can determine an order in which to handle incoming communications to reduce delays in delivering important messages, thereby improving the efficiency of message delivery, particularly in times of emergency or low network bandwidth.

At operation 704 (e.g., using one or more components described above), the message transmission system can receive a first message transmission request. For example, the message transmission system can receive a first message transmission request from a first user, wherein the first message transmission request comprises a first message. As an illustrative example, the SMSC 240 can receive a textual message from a sender that includes a message, as shown in FIG. 3 as the message transmission request 302. By receiving the textual message, along with related transmission metadata (including the apparent recipient of the message, timestamp, and any additional information, such as prioritization flags), the message transmission system can determine which messages to prioritize, thereby improving the effectiveness and efficiency of the message transmission system during periods of high bandwidth.

At operation 706 (e.g., using one or more components described above), the message transmission system can determine that the message includes a prioritization indicator. For example, the message transmission system can process the first message transmission request to determine whether the first message transmission request contains a first prioritization indicator. As an illustrative example, the message transmission system can determine whether the message transmission request includes any elements 408 in the message prioritization database 402 associated with the sender (e.g., with the sender identifier 404). For example, if the message is determined to include five exclamation points in a row ("!!!!!"), the message transmission system can determine the presence of this prioritization indicator. By doing so, the message transmission system (e.g., the SMSC 240) can determine a priority for the message based on information associated with the message, enabling dynamic handling of messages received at the message transmission system.

In some implementations, the message transmission system can determine prioritization indicators based on a sender or apparent recipient of the message, as well as based on elements of the message, and combine these to generate the first prioritization indicator. For example, the message transmission system can determine, based on the transmission metadata, a first user identifier of the first user or a second user identifier of a second user, wherein the second user comprises an intended recipient of the first message. Based on determining a match between the first user identifier or the second user identifier and at least one stored user identifier in a user database, the message transmission system can identify a second prioritization indicator. The message transmission system can identify a third prioritization indicator based on a first element of the first message, wherein the first element includes a character indicating priority. Based on the second prioritization indicator and the third prioritization indicator, the message transmission system can generate the first prioritization indicator. The system may determine individual QoS indicators for each of these matches and combine these to determine the first prioritization indicator. As such, the message transmission system can combine multiple priorities based on multiple elements found in a message to determine the priority, thereby improving the flexibility and accuracy of priority determination within the message transmission system.

In some implementations, the message transmission system can determine the third prioritization indicator based on matching elements between the message and elements of the message prioritization database. For example, the message transmission system can compare one or more elements of the first message with stored elements in a message prioritization database. Based on determining that the first element matches one or more elements of the stored elements, the message transmission system can generate the third prioritization indicator. As an illustrative example, the message transmission system can determine that an element (e.g., a token of tokens 416) of the message prioritization database 402 of FIG. 4 matches with an element of the first message and that a recipient identifier of the recipient identifiers 412 matches the transmission metadata of the first message transmission request. As such, the message transmission system can determine specific portions (e.g., tokens, such as words, phrases, or characters) associated with the message that are likely indicative of an emergency situation or other high-priority message.

In some implementations, the message transmission system can identify a flag associated with the first message and determine the first prioritization indicator according to the flag. For example, the message transmission system can determine that the transmission metadata includes a flag associated with the first message. The message transmission system can determine that the first message transmission request contains the first prioritization indicator based on the flag. As an illustrative example, the message transmission system can determine that a field associated with the message transmission request 302 (and/or the associated transmission metadata) indicates a priority (e.g., a flag). Such a flag can be set by the sender (e.g., a user of a mobile device) based on, for example, a combination of buttons or controls on the mobile device that serve to indicate a high-priority message. In response to user manipulation of the combination of buttons or controls, the mobile device can add the flag to the transmission metadata of the first message. As such, the message transmission system enables a user to mark a priority level during transmission of the message to the corresponding SMSC.

In some implementations, the message transmission system can determine the first prioritization indicator based on determining that the message includes reference characters from a reference database. For example, the message transmission system can determine one or more special characters in the first message. Based on comparing the one or more special characters with reference characters in a reference database, the message transmission system can identify one or more matching characters, wherein the one or more matching characters indicate characters of the one or more special characters that match with one or more reference characters of the reference database. The message transmission system can determine that the first message transmission request contains the first prioritization indicator based on the one or more matching characters. As an illustrative example, the message transmission system can identify that five exclamation points in a row ("!!!!!") that exist in a message are indicative of a very high QoS indicator, as shown in FIG. 4. By doing so, the message transmission system can analyze the contents of a message to determine priority levels associated with the message (e.g., as many exclamation points can indicate an emergency or urgent situation). Furthermore, by enabling users to modify or set the characters associated with the reference database, the message transmission system enables user flexibility and customization over the conditions of prioritization of messages.

In some implementations, the message transmission system can detect priority tokens (e.g., phrases, words, or sentences) within the message that are likely indicative of a prioritization indicator (e.g., based on an NLP model). For example, based on providing the first message to an NLP model, the message transmission system can detect one or more priority tokens that indicate a high priority for the first message. Based on detecting the one or more priority tokens, the message transmission system can determine that the first message transmission request contains the first prioritization indicator. As an illustrative example, the message transmission system can provide the first message to an NLP model to determine a list of tokens identified within the message, as well as corresponding QoS indicators (e.g., prioritization indicators for each token). The message transmission system can determine an overall prioritization indicator for the message based on, for example, an average or combination of these prioritization indicators for the tokens, thereby improving the accuracy of priority determination for received messages.

At operation 708 (e.g., using one or more components described above), the message transmission system can add the first message to the queue at a higher rank based on determining that the message includes a prioritization indicator. For example, when the first message transmission request contains the first prioritization indicator, the message transmission system (e.g., the SMSC 240) can add the first message to the queue at a higher position rank than at least a subset of other messages in the queue that were received at the SMSC before the first message. As an illustrative example, the first prioritization indicator can be associated with a QoS indicator or metric quantifying or characterizing a priority level for the message. Based on this metric or indicator, the SMSC 240 can determine to confer a higher rank (e.g., a lower rank number) to the message than for other messages in the message queue with a lower QoS indicator within a threshold period of time of message receipt at the SMSC, for example. By doing so, the SMSC 240 can prioritize messages determined to be important, urgent, or emergency-related over other messages, even if these other messages arrived at the SMSC earlier. Thus, the SMSC 240 can improve the effectiveness of emergency communications during emergency situations.

In some implementations, the message transmission system can transmit a second message to another user (e.g., based on message modification criteria, as discussed above) based on the prioritization indicator. For example, based on determining that the first message transmission request contains the first prioritization indicator, the message transmission system can generate a second message associated with the first user. The message transmission system can transmit the second message to a second user. As an illustrative example, the message transmission system can determine to generate a new message or redirect the first message to another recipient (or to the original recipient) according to conditions associated with a message modification criterion. By doing so, the message transmission system enables high-priority messages to be redirected, as requested by a user, in times of emergency or distress.

At operation 710 (e.g., using one or more components described above), the message transmission system can determine that a message does not include a prioritization indicator or that the message includes a de-prioritization indicator. In response to this determination, the message transmission system can process the message transmission request with a lower rank than for messages that include a higher prioritization indicator. For example, the message transmission system can process the first message transmission request to determine whether the first message transmission request comprises a first de-prioritization indicator. When the first message transmission request contains the first de-prioritization indicator, the message transmission system can add the first message to the queue at a lower rank than at least a subset of other messages in the queue that were received at the SMSC before the first message such that the first message is transmitted to an intended recipient after a time delay. As an illustrative example, the message transmission system can determine whether a message includes information with a low priority, such as jokes or memes. Based on this determination, the message transmission system can determine to prioritize higher-importance messages, such as in times of limited bandwidth, thereby improving the efficacy (e.g., reducing the delay) of the telecommunications network 200 for transmission of more important communications.

In some implementations, the message transmission system can begin to prioritize all received messages according to the order of receipt at the message transmission system (e.g., the SMSC 240) following the end of an emergency. For example, the message transmission system can receive an indication of an end of an emergency. In response to the indication of the end of the emergency, the message transmission system can determine to transmit the first message to the intended recipient. As an illustrative example, during an emergency situation, the message transmission system can determine ranks of messages to be transmitted to intended recipients according to both timestamps of receipt at the SMSC 240, as well as their corresponding prioritization indicators (e.g., QoS indicators). Once the SMSC determines that the emergency is over (e.g., determines that the end of the emergency has occurred), the SMSC can determine to transmit all remaining messages within the message queue according to order of receipt. By doing so, the system can reduce delays for all messages in situations where the bandwidth is not limited.

Process for Message Modification and/or Redirection

FIG. 8 is a flowchart 800 illustrating a process for modifying a message transmission request received at a message transmission system (e.g., an SMSC) based on a message modification criterion, in accordance with one or more implementations disclosed herein. For example, the process illustrated in FIG. 8 enables the SMSC 240 to generate different messages and/or transmit messages to different recipients based on indicators or criteria associated with messages received at the SMSC 240. By doing so, the message transmission system enables users to send masked messages, as well as messages to other recipients, even though such messages appear with different apparent recipients or messages on the sender's device. As such, the sender can avoid situations of retaliation, for example, by masking the contents and recipients of messages initiated by the sender.

At operation 802 (e.g., using one or more components described above), the message transmission system can receive a message transmission request from a user that includes a message and/or transmission metadata. For example, the message transmission system can receive a message transmission request from a first user, wherein the message transmission request comprises a first textual message and first transmission metadata. As an illustrative example, the SMSC 240 can receive the message transmission request 302, as shown in FIG. 3, including information characterizing the message, as well as the message itself (e.g., the intended message 312). By receiving such information, the SMSC 240 can determine whether the message satisfies the condition for redirection or modification prior to transmission to another device.

At operation 804 (e.g., using one or more components described above), the message transmission system can determine a first user identifier associated with the message. For example, the SMSC 240 can determine, based on the first transmission metadata, a first user identifier of the first user. As an illustrative example, the SMSC 240 can determine a phone number associated with the first user's mobile device (e.g., shown as the sender identifier 306 in the message transmission request 302 of FIG. 3). By identifying such a phone number, the message transmission system can analyze the sent message according to criteria defined by or particular to the sender, thereby improving the system's flexibility and security with respect to individual message senders.

At operation 806 (e.g., using one or more components described above), the message transmission system can determine message modification criterion according to the first user identifier. For example, the message transmission system can determine, based on the first user identifier, a message modification criterion corresponding to the first user, wherein the message modification criterion indicates at least one condition for modifying the message transmission request. As an illustrative example, the SMSC 240 can determine (e.g., through a database) a message modification criterion 602 corresponding to the corresponding user identifier (e.g., the sender identifier 604), as shown in FIG. 6A. By doing so, the message transmission system enables user-specific criteria for determining whether to generate a new message or a new recipient to which to send a message based on both the sender and the characteristics of the message.

At operation 808 (e.g., using one or more components described above), the message transmission system can determine that the message satisfies a condition of the message modification criterion and process the message accordingly. For example, the SMSC 240 can process the message transmission request based on the message modification criterion to determine whether the message transmission request satisfies the condition. In some implementations, the message transmission system can determine that the message transmission request satisfies the condition based on a keyword. For example, the message transmission system can determine that the condition indicated by the message modification criterion includes an indication of a keyword. The message transmission system can determine that the first textual message includes the keyword. In response to determining that the first textual message includes the keyword, the message transmission system can determine that the message transmission request satisfies the condition.

As an illustrative example, the message transmission system can determine that the message includes a keyword within the message modification criterion 602 corresponding to the sender identifier 604. Based on this determination of the keyword, the message transmission system can determine to send the same message or another message to another recipient (e.g., as defined by a redirection recipient identifier of redirection recipient identifiers 610). By doing so, the message transmission system enables users to send masked messages to users of mobile devices, even if such users were not identified in the original message, thereby improving the security of the user in situations of distress (e.g., where a user may face retaliation for sending a particular type of message).

At operation 810 (e.g., using one or more components described above), the message transmission system can generate a second message or second transmission metadata for transmission of a message to an intended recipient. For example, when the message transmission request satisfies the condition, the message transmission system (e.g., SMSC 240) can modify the message transmission request by causing generation of a second textual message or second transmission metadata. As an illustrative example, the message transmission system can generate a new or predetermined message distinct from the first message for transmission to another recipient (e.g., an emergency service or a trusted entity) based on satisfaction of the message modification criterion. In some implementations, the SMSC 240 can cause transmission of a message according to this modified message transmission request accordingly, thereby enabling masked messages with recipients or messages distinct from those sent by the sender.

At operation 812 (e.g., using one or more components described above), the message transmission system can transmit the message according to the first transmission metadata when the message transmission request does not satisfy conditions specified within the message modification criterion. As an illustrative example, a message that does not include any elements associated with message modification as associated with the sender can be sent according to the original message transmission request to the apparent recipient and with the original message.

In some implementations, the message transmission system can determine an apparent recipient for the message. For example, the message transmission system can determine, based on the first transmission metadata, a second user identifier of a second user, wherein the second user identifier (e.g., a phone number) comprises an apparent recipient for the first textual message. As an illustrative example, the message transmission system can determine a recipient phone number that appears within the sender's phone, even if the sender desires to send a message to another recipient in a masked or discreet way. By doing so, the message transmission system can determine whether the received message and associated message transmission requests are candidates for modification according to message modification criteria.

In some implementations, the message transmission system can determine that the message indeed satisfies a condition associated with message modification (e.g., message redirection) based on the user identifier of the apparent recipient. For example, the message transmission system can determine that the condition indicated by the message modification criterion includes an indication of the second user identifier. In response to determining that the condition includes the indication of the second user identifier, the message transmission system can determine that the message transmission request satisfies the condition. As an illustrative example, the message modification criterion 602 associated with the sender identifier 604 includes an apparent recipient 618 (e.g., as shown in FIG. 6A); the message modification system can determine that this apparent recipient 618 matches an apparent recipient identifier 308 of the message transmission request 302 (e.g., as shown in FIG. 3), and, as such, the message transmission system can determine that the condition has been satisfied. As such, the message transmission system can determine to alter the message or the actual recipient of the message on the basis of the number to which the message appears to be directed, thereby improving the flexibility that the user has in determining when messages are redirected or modified.

In some implementations, the message transmission system can cause transmission of a different message to the apparent recipient. For example, the SMSC 240 can generate, based on the message modification criterion, the second textual message for the apparent recipient of the first textual message. The SMSC 240 can cause, based on the second user identifier, a transmission of the second textual message to the apparent recipient. As an illustrative example, a sender may desire to mask the intended recipient of a given message while maintaining the contents of the message. The message transmission system can execute this masking by enabling transmission of the same message but to a different phone number (e.g., as defined within the message modification criterion).

In some implementations, the message transmission system can generate a different message and transmit this to different recipients according to the message modification criterion. For example, the message transmission system (e.g., SMSC 240) can determine, based on the message modification criterion, at least one recipient for the first textual message. The message transmission system can cause the generation of the second transmission metadata to include an indication of the at least one recipient. When the message transmission request satisfies the condition, the message transmission system can cause a transmission of the second textual message to the at least one recipient. As an illustrative example, the message transmission system can generate a new message (e.g., as predetermined by the sender within the message modification criterion or based on natural language generation (NLG)) to be sent to recipients (e.g., the apparent recipient or a different recipient). By doing so, the system enables generation of a second message for transmission to other recipients, improving the flexibility of the system.

In some implementations, the message transmission system can transmit the same message to a different recipient. For example, the message transmission system can determine, based on the message modification criterion, at least one recipient for the first textual message, wherein the at least one recipient for the first textual message is different from the apparent recipient for the first textual message. The message transmission system can generate the second transmission metadata to include an indication of the at least one recipient for the first textual message. When the message transmission request satisfies the condition, the message transmission system can cause a transmission of the first textual message to the at least one recipient. As an illustrative example, the message transmission system can transmit the same textual message (e.g., any message) to another phone number different to the number indicated by the sender during composing of the text message. As such, the message transmission system enables redirection of the same message to different recipients based on characteristics of the message or message transmission request.

Computer System

Figure 9:
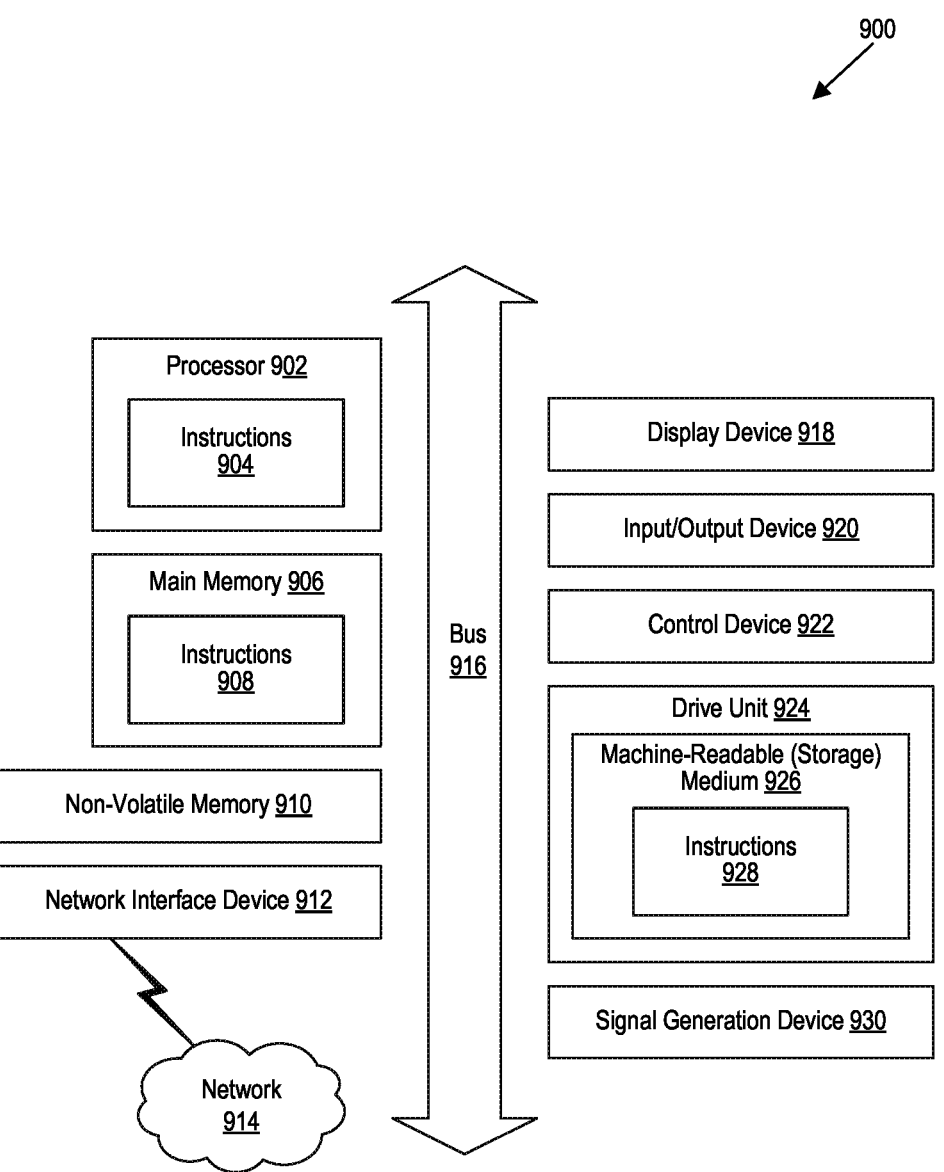
FIG. 9 is a block diagram that illustrates components of a computing device in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

5G Core Network Functions

Figure 10:
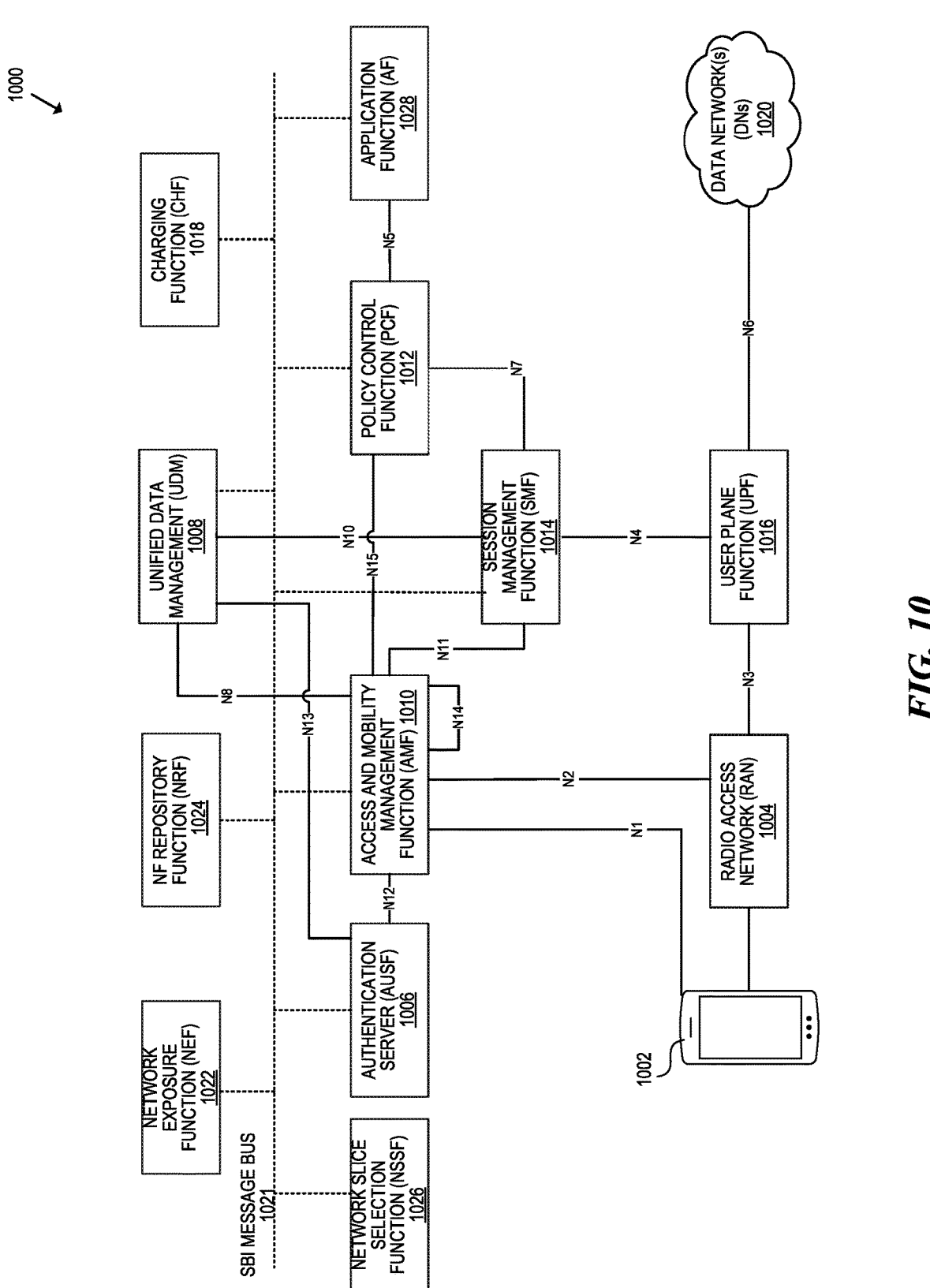
FIG. 10 is a block diagram that illustrates 5G core network functions (NFs) that can implement aspects of the present technology.

FIG. 10 is a block diagram that illustrates an architecture 1000 including 5G core network functions (NFs) that can implement aspects of the present technology. A wireless device 1002 can access the 5G network through a NAN (e.g., gNB) of a RAN 1004. The NFs include an Authentication Server Function (AUSF) 1006, a Unified Data Management (UDM) 1008, an Access and Mobility management Function (AMF) 1010, a Policy Control Function (PCF) 1012, a Session Management Function (SMF) 1014, a User Plane Function (UPF) 1016, and a Charging Function (CHF) 1018.

The interfaces N1 through N15 define communications and/or protocols between each NF as described in relevant standards. The UPF 1016 is part of the user plane and the AMF 1010, SMF 1014, PCF 1012, AUSF 1006, and UDM 1008 are part of the control plane. One or more UPFs can connect with one or more data networks (DNs) 1020. The UPF 1016 can be deployed separately from control plane functions. The NFs of the control plane are modularized such that they can be scaled independently. As shown, each NF service exposes its functionality in a Service Based Architecture (SBA) through a Service Based Interface (SBI) 1021 that uses HTTP/2. The SBA can include a Network Exposure Function (NEF) 1022, an NF Repository Function (NRF) 1024 a Network Slice Selection Function (NSSF) 1026, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 1024, which maintains a record of available NF instances and supported services. The NRF 1024 allows other NF instances to subscribe and be notified of registrations from NF instances of a given type. The NRF 1024 supports service discovery by receipt of discovery requests from NF instances and, in response, details which NF instances support specific services.

The NSSF 1026 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 1002 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 1008 and then requests an appropriate network slice of the NSSF 1026.

The UDM 1008 introduces a User Data Convergence (UDC) that separates a User Data Repository (UDR) for storing and managing subscriber information. As such, the UDM 1008 can employ the UDC under 3GPP TS 22.101 to support a layered architecture that separates user data from application logic. The UDM 1008 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 1008 can contain voluminous amounts of data that is accessed for authentication. Thus, the UDM 1008 is analogous to a Home Subscriber Server (HSS) and can provide authentication credentials while being employed by the AMF 1010 and SMF 1014 to retrieve subscriber data and context.

The PCF 1012 can connect with one or more Application Functions (AFs) 1028. The PCF 1012 supports a unified policy framework within the 5G infrastructure for governing network behavior. The PCF 1012 accesses the subscription information required to make policy decisions from the UDM 1008 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 1024. This allows the SCP to become the delegated discovery point in a datacenter, off-loading the NRF 1024 from distributed service meshes that make up a network operator's infrastructure. Together with the NRF 1024, the SCP forms the hierarchical 5G service mesh.

The AMF 1010 receives requests and handles connection and mobility management while forwarding session management requirements over the N11 interface to the SMF 1014. The AMF 1010 determines that the SMF 1014 is best suited to handle the connection request by querying the NRF 1024. That interface and the N11 interface between the AMF 1010 and the SMF 1014 assigned by the NRF 1024 use the SBI 1021. During session establishment or modification, the SMF 1014 also interacts with the PCF 1012 over the N7 interface and the subscriber profile information stored within the UDM 1008. Employing the SBI 1021, the PCF 1012 provides the foundation of the policy framework that, along with the more typical QoS and charging rules, includes network slice selection, which is regulated by the NSSF 1026.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory, computer-readable storage medium storing instructions, which, when executed by at least one data processor of a short message service center (SMSC) in a telecommunications network, cause the SMSC to:

maintain a queue of messages transmitted to or from user devices in the telecommunications network, wherein a message at a higher rank in the queue is transmitted from the SMSC to a corresponding recipient before a message at a lower rank in the queue;

receive a first message transmission request from a first user, wherein the first message transmission request comprises a first message;

process the first message transmission request to determine whether the first message transmission request contains at least one of: (1) a first prioritization indicator or (2) a first de-prioritization indicator;

when the first message transmission request contains the first prioritization indicator, add the first message to the queue at a higher rank than at least a subset of other messages in the queue that were received at the SMSC before the first message; and when the first message transmission request contains the first de-prioritization indicator, add the first message to the queue at a lower rank than at least a subset of other messages in the queue that were received at the SMSC before the first message such that the first message is transmitted to an intended recipient after a time delay.

2. The at least one non-transitory, computer-readable storage medium of claim 1, wherein the first message transmission request comprises transmission metadata, and wherein the instructions cause the SMSC to:

determine, based on the transmission metadata, a first user identifier of the first user or a second user identifier of a second user, wherein the second user comprises an intended recipient of the first message;

based on determining a match between the first user identifier or the second user identifier and at least one stored user identifier in a user database, identify a second prioritization indicator;

identify a third prioritization indicator based on a first element of the first message, wherein the first element includes a character indicating priority; and based on the second prioritization indicator and the third prioritization indicator, generate the first prioritization indicator.

3. The at least one non-transitory, computer-readable storage medium of claim 2, wherein identifying the third prioritization indicator based on the first element of the first message comprises:

comparing one or more elements of the first message with stored elements in a message prioritization database; and based on determining that the first element matches one or more elements of the stored elements, identifying the third prioritization indicator.

4. The at least one non-transitory, computer-readable storage medium of claim 1, wherein the first message transmission request comprises transmission metadata, and wherein the instructions cause the SMSC to:

determine that the transmission metadata includes a flag associated with the first message; and determine that the first message transmission request contains the first prioritization indicator based on the flag.

5. The at least one non-transitory, computer-readable storage medium of claim 1, wherein the instructions cause the SMSC to:

determine one or more special characters in the first message;

based on comparing the one or more special characters with reference characters in a reference database, identify one or more matching characters, wherein the one or more matching characters indicate characters of the one or more special characters that match with one or more reference characters of the reference database; and determine that the first message transmission request contains the first prioritization indicator based on the one or more matching characters.

6. The at least one non-transitory, computer-readable storage medium of claim 1, wherein the instructions cause the SMSC to:

based on providing the first message to a natural language processing (NLP) model, detect one or more priority tokens that indicate a high priority for the first message; and based on detecting the one or more priority tokens, determine that the first message transmission request contains the first prioritization indicator.

7. The at least one non-transitory, computer-readable storage medium of claim 1, wherein the instructions cause the SMSC to:

receive an indication of an end of an emergency; and in response to the indication of the end of the emergency, determine to transmit the first message to the intended recipient.

8. The at least one non-transitory, computer-readable storage medium of claim 1, wherein the instructions cause the SMSC to:

based on determining that the first message transmission request contains the first prioritization indicator, generate a second message associated with the first user; and transmit the second message to a second user.

9. A short message service center (SMSC) system comprising:

at least one hardware processor; and at least one non-transitory, computer-readable storage medium storing instructions, which, when executed by the at least one hardware processor, cause the SMSC system to:

maintain a queue of messages transmitted to or from user devices in a telecommunications network, wherein a message at a higher rank in the queue is transmitted from an SMSC to a corresponding recipient before a message at a lower rank in the queue;

receive a first message transmission request from a first user, wherein the first message transmission request comprises a first message;

process the first message transmission request to determine whether the first message transmission request contains at least one of: (1) a first prioritization indicator or a first de-prioritization indicator;

when the first message transmission request contains the first prioritization indicator, add the first message to the queue at a higher rank than at least a subset of other messages in the queue that were received at the SMSC before the first message; and when the first message transmission request contains the first de-prioritization indicator, add the first message to the queue at a lower rank than at least a second subset of other messages in the queue that were received at the SMSC before the first message such that the first message is transmitted to an intended recipient after a time delay or a transmission instruction.

10. The SMSC system of claim 9, wherein the first message transmission request comprises transmission metadata, and wherein the instructions cause the SMSC system to:

determine, based on the transmission metadata, a first user identifier of the first user or a second user identifier of a second user, wherein the second user comprises an intended recipient of the first message;

based on determining a match between the first user identifier or the second user identifier and at least one stored user identifier in a user database, identify a second prioritization indicator;

identify a third prioritization indicator based on a first element of the first message, wherein the first element includes a character indicating priority; and based on the second prioritization indicator and the third prioritization indicator, generate the first prioritization indicator.

11. The SMSC system of claim 10, wherein identifying the third prioritization indicator based on the first element of the first message comprises:

comparing one or more elements of the first message with stored elements in a message prioritization database; and based on determining that the first element matches one or more elements of the stored elements, identifying the third prioritization indicator.

12. The SMSC system of claim 9, wherein the first message transmission request comprises transmission metadata, and wherein the instructions cause the SMSC system to:

determine that the transmission metadata includes a flag associated with the first message; and determine that the first message transmission request contains the first prioritization indicator based on the flag.

13. The SMSC system of claim 9, wherein the instructions cause the SMSC system to:

determine one or more special characters in the first message;

based on comparing the one or more special characters with reference characters in a reference database, identify one or more matching characters, wherein the one or more matching characters indicate characters of the one or more special characters that match with one or more reference characters of the reference database; and determine that the first message transmission request contains the first prioritization indicator based on the one or more matching characters.

14. The SMSC system of claim 9, wherein the instructions cause the SMSC system to:

based on providing the first message to a natural language processing (NLP) model, detect one or more priority tokens that indicate a high priority for the first message; and based on detecting the one or more priority tokens, determine that the first message transmission request contains the first prioritization indicator.

15. The SMSC system of claim 10, wherein the instructions cause the SMSC system to:

receive an indication of an end of an emergency; and in response to the indication of the end of the emergency, determine to transmit the first message to the intended recipient by generating the transmission instruction.

16. The SMSC system of claim 9, wherein the instructions cause the SMSC system to:

based on determining that the first message transmission request contains the first prioritization indicator, generate a second message associated with the first user; and transmit the second message to a second user.

17. A method for prioritizing messages at a short message service center (SMSC) comprising:

maintaining, by the SMSC, a queue of messages transmitted to or from user devices in a telecommunications network, wherein a message at a higher rank in the queue is transmitted from an SMSC to a corresponding recipient before a message at a lower rank in the queue;

receiving a first message transmission request from a first user, wherein the first message transmission request comprises a first message;

processing the first message transmission request to determine whether the first message transmission request contains at least one of (1) a first prioritization indicator or (2) a first de-prioritization indicator;

when the first message transmission request contains the first prioritization indicator, adding the first message to the queue at a higher rank than at least a subset of other messages in the queue that were received at the SMSC before the first message; and when the first message transmission request contains the first de-prioritization indicator, add the first message to the queue at a lower rank than at least a second subset of other messages in the queue that were received at the SMSC before the first message such that the first message is transmitted to an intended recipient after a time delay or a transmission instruction.

18. The method of claim 17, further comprising:

determining transmission metadata based on the first message transmission request;

determining, based on the transmission metadata, a first user identifier of the first user or a second user identifier of a second user, wherein the second user comprises an intended recipient of the first message;

based on determining a match between the first user identifier or the second user identifier and at least one stored user identifier in a user database, identifying a second prioritization indicator;

identifying a third prioritization indicator based on a first element of the first message, wherein the first element includes a character indicating priority; and based on the second prioritization indicator and the third prioritization indicator, generating the first prioritization indicator.

* * * * *